United States Patent
Selvaganapathy et al.

(10) Patent No.: US 12,369,121 B2
(45) Date of Patent: Jul. 22, 2025

(54) ENHANCEMENTS FOR WARNING/ALERT SYSTEM NOTIFICATION WITH WAKE UP SIGNAL

(71) Applicant: Nokia Technologies Oy, Espoo (FI)

(72) Inventors: Srinivasan Selvaganapathy, Bangalore (IN); Nitin Mangalvedhe, Hoffman Estates, IL (US); Rapeepat Ratasuk, Inverness, IL (US); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 540 days.

(21) Appl. No.: 17/785,708

(22) PCT Filed: Dec. 21, 2020

(86) PCT No.: PCT/IB2020/062310
§ 371 (c)(1),
(2) Date: Jun. 15, 2022

(87) PCT Pub. No.: WO2021/144642
PCT Pub. Date: Jul. 22, 2021

(65) Prior Publication Data
US 2023/0051930 A1 Feb. 16, 2023

(30) Foreign Application Priority Data
Jan. 15, 2020 (IN) .............................. 202041001787

(51) Int. Cl.
*H04W 68/02* (2009.01)
*H04W 52/02* (2009.01)

(52) U.S. Cl.
CPC ... *H04W 52/0232* (2013.01); *H04W 52/0216* (2013.01); *H04W 68/02* (2013.01)

(58) Field of Classification Search
CPC ......... H04W 52/0232; H04W 52/0216; H04W 68/02; H04W 52/0235; H04W 68/005; H04W 68/025; H04W 76/28; Y02D 30/70
USPC .......................................... 370/318; 455/312
See application file for complete search history.

(56) References Cited

FOREIGN PATENT DOCUMENTS

EP 3509368 A1 * 7/2019 ............ H04W 52/02

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.4.0, Jun. 2019, pp. 1-55.
"Wake up signal function for NB-IoT", 3GPP TSG RAN WG1 Meeting #90bis, R1-1801617, Agenda: 6.2.6.1.1.1, ZTE, Feb. 26-Mar. 2, 2018, 6 pages.

(Continued)

*Primary Examiner* — Marcos Batista
(74) *Attorney, Agent, or Firm* — Barta Jones, PLLC (57) ABSTRACT

A method may include monitoring, by a user equipment, a first wake up signal prior to a paging occasion during a discontinuous reception cycle. The method may also include decoding a physical downlink control channel based on the paging occasion in response to detecting the first wake up signal. The method may also include determining that the decoding failed. The method may further include switching to a common paging occasion to decode the physical downlink control channel after determining that the decoding failed.

17 Claims, 4 Drawing Sheets

(56) References Cited

OTHER PUBLICATIONS

International Search Report and Written Opinion received for corresponding Patent Cooperation Treaty Application No. PCT/IB2020/062310, dated Mar. 22, 2021, 11 pages.
"Draft Report of 3GPP TSG RAN WG1 #97 v0.2.0", 3GPP TSG RAN WG1 Meeting #98, R1-190xxxx, MCC Support, Aug. 26-30, 2019, 158 pages.

* cited by examiner

ENHANCEMENTS FOR WARNING/ALERT SYSTEM NOTIFICATION WITH WAKE UP SIGNAL

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for enhancing a warning/alert system notification with a wake up signal.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for enhancing a warning/alert system notification with a wake up signal.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments. Further, as used herein, "system information notification" may be referred to as "system information indication" and vice versa.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

In $3^{rd}$ Generation Partnership Project (3GPP) Rel-16, improvement with group-based wake up signal (WUS) was introduced where WUS for a sub-group of user equipments (UEs) is supported, and the group-based WUS may be scheduled when the paging message includes a page for the sub-group. This may avoid false wake-up of the UE when a page is sent for another sub-group.

In conventional systems, whenever system information change needs to be notified to the UE monitoring the paging occasions (POs) over discontinuous reception (DRX) cycles, an enhanced Node B (eNB) may send a paging indication as a message on the PO (e.g., in case of LTE), or send physical downlink control channel (PDCCH)/narrow band physical downlink control channel (NPDCCH) containing the notification about the system information changes. Based on this indication, the UE may switch to system information reception to read the modified system information. In case of commercial mobile alert system (CMAS)/earthquake and tsunami warning system (ETWS) notification, the CMAS/ETWS may be read from a relevant system information block based on the notification.

In this case, PDCCH/NPDCCH may be scheduled in all the POs to send this notification to all the UEs. In case of LTE, PDCCH and physical downlink shared channel (PDSCH) may need to be scheduled in all the POs monitored by different UEs within the DRX cycle. However, doing so may consume significant resources over a set of DRX cycles during the system information modification period. Thus, in order to support the notification for the UEs configured with WUS, the eNB may need to schedule both WUS and PDCCH for all POs. This may further increase the resource utilization for such a common notification compared to the system without WUS support. However, the resource utilization for this scenario may be enhanced with modifications related to the WUS reception.

WUS for paging is defined in 3GPP TS 36.304. In 3GPP Rel-15 WUS discussions, a periodic cell-specific WUS that is common to all POs was proposed. The proposed function of this cell-specific WUS was to enable the UE to determine whether it should decode the PDCCH at the PO.

In 3GPP Rel-16, a common WUS for waking up all UEs may be supported in addition to UE-group WUS. This common WUS may be used to wake up all UEs for system information or other common notifications. However, this common WUS needs to be transmitted before every PO. In addition, the PDCCH for the notification must be scheduled in each PO.

As part of the enhanced machine-type communication (eMTC)/narrowband Internet of Things (NB-IoT) enhancement work in 3GPP Rel-15, WUS was introduced to reduce the energy consumption associated with downlink (DL) monitoring for paging in idle mode of a UE. In certain example embodiments, WUS may be sent prior to every paging occasion if there is a valid paging message to be sent on the PO for a UE capable of WUS reception. When there is no paging scheduled for the UE, there may not be a WUS transmission scheduled. According to an example embodiment, the UE may first attempt to detect the WUS prior to its PO and, if the WUS is not detected, the UE may enter into sleep mode without further monitoring the PDCCH on the PO. In other example embodiments, enhancements may be provided for the paging scenarios associated with common paging to all UEs such as system information modification and CMAS/ETWS indication.

In addition, as part of the enhanced machine-type communication (eMTC)/narrowband Internet of Things (NB-IoT) enhancement work in 3GPP Rel-15, another signal, the go-to-sleep signal (GTSS), was discussed as part of the work to reduce the energy consumption associated with downlink (DL) monitoring for paging in idle mode of a UE. In certain example embodiments, GTSS may be sent prior to every paging occasion if there is no valid paging message to be sent on the PO for a UE capable of GTSS reception. When there is no paging scheduled for the UE, there will be a GTSS transmission scheduled. According to an example embodiment, the UE may first attempt to detect the GTSS prior to its PO and, if the GTSS is detected, the UE may enter into sleep mode without further monitoring the PDCCH on the PO. In other example embodiments, enhancements may be provided for the paging scenarios associated with common paging to all UEs such as system information modification and CMAS/ETWS indication.

According to certain example embodiments, when the WUS or GTSS support is introduced for NR-based IoT devices in 3GPP Rel-17, similar to WUS in 3GPP Rel-16 IoT system, WUS may be scheduled before every PO to indicate presence or absence of valid paging on the PO. In this deployment, it may be possible to optimize the system information change notification with common PDCCH per DRX cycle instead of scheduling the PDCCH in each PO.

According to an example embodiment, the UE may attempt to decode the next occurring PO after detecting the WUS. If decoding fails, the UE may go back to sleep and wait for another WUS. However, in an alternative example embodiment, the UE may be configured (i.e., through UE implementation) to monitor multiple POs (e.g., in successive DRX cycles) after WUS detection of PDCCH decoding continues to fail.

In an example embodiment, the eNB may configure a fixed PO among all the POs where the PDCCH is to be monitored for system information modification for the UE that is capable of receiving WUS. For instance, the UE may monitor for the common WUS prior to the PO. If the WUS is detected, the UE may attempt to decode the PDCCH on the PO using a paging radio network temporary identifier (P-RNTI) for downlink control information (DCI). According to an example embodiment, if the PDCCH decoding fails after a predefined number of attempts at POs occurring in successive DRX cycles, the UE may conclude that the WUS is scheduled for common notification such as system information change or CMAS. In addition, at this time, the UE may switch from monitoring its own PO to monitoring the fixed common PO or location configured by the eNB to decode the PDCCH for receiving system information modification.

In an example embodiment if PDCCH decoding succeeds, then there is a paging message intended for the UE. For example, if decoding is successful, then the normal procedure for receiving a paging message may be followed. However, when decoding fails, the UE assumes that there is no paging message and therefore the UE interprets this as a notification of system information change or CMAS.

According to an example embodiment, the UE may be configured by the network with a number of DRX cycle attempts to decode the PDCCH. For instance, the UE may be configured with multiple attempts to decode the PDCCH in successive POs that may increase up to a maximum repetition number. According to another example embodiment, the UE may be configured with extended/enhanced DRX (eDRX), and may be configured to monitor multiple successive POs within an eDRX cycle after WUS detection. Further, when the PDCCH decoding fails even after multiple attempts, the UE may revert to monitoring the WUS in idle mode.

In an example embodiment, a common PO may be defined for a plurality of UEs. The PO may be common to a plurality of UEs. For example, this PO may be common to UEs in the cell that may have been configured with different POs for paging monitoring, also known as normal paging monitoring. Further, the common PO may be configured at a fixed time, and therefore may occur at different time offsets relative to different configured POs. For example, in one embodiment, the fixed PO may be defined at one or more locations within a hyper frame. According to another example embodiment, after the UE fails to decode the PDCCH, instead of going back to monitoring the WUS, the UE may monitor the fixed PO using P-RNTI for the PDCCH containing the common notification in the DCI. In addition, the UE may return to sleep mode (e.g., light sleep) until the occurrence of the fixed PO. In another example embodiment, if the UE fails to decode the PDCCH, the UE may revert to monitoring the WUS in the idle mode.

As described above, on certain occasions, the UE may fail to decode the PDCCH. In particular, the UE may rely on the decoding failure at the PDCCH where it successfully detected WUS for the PO. In this case, the decoding may be expected to be successful according to the block error rate (BLER) performance associated with the PDCCH. Considering the PDCCH BLER performance as 1%, only 1% of the cases where the PDCCH decoding may fail and UE may improperly attempt to decode for PDCCH in the fixed location. Thus, according to certain example embodiments, it may not be necessary to change the WUS sequence transmission for sending a single PDCCH for system information modification instead of sending it multiple times in all the POs. In addition, certain example embodiments may be applicable for system information notification or CMAS/

ETWS notification to a normal UE, if the UE also supports the WUS reception to avoid repeating the paging in all POs of the DRX cycle.

According to certain example embodiments, enhancements may be achieved to reduce the successive decoding attempts by the UE for receiving system information changes. For instance, in one embodiment, the eNB may schedule the demodulation reference signal (DMRS) or short reference symbols within the slots of PDCCH to indicate the presence of common PDCCH for system information notification. In another example embodiment, the UE may first detect the WUS before its PO and on the PO, the UE may first attempt to decode the DMRS or reference symbol that is assigned in the cell for paging reception. According to an example embodiment, if the channel estimation for the cell specific DMRS/reference symbol falls below a specific threshold configured by the higher layer, the UE may also attempt to detect DMRS corresponding to common system information notification. If this signal is detected with a higher energy level (e.g. received signal power that is higher than a configured threshold), then the UE may deduce the transmission of the common PDCCH, and subsequently decode the common PDCCH at a fixed location.

In an example embodiment, the cell-specific DMRS/reference symbols for common system information notification may be transmitted at the PO. In another example embodiment, the cell-specific DMRS/reference symbols may include a sequence that is mapped to predefined resource elements (REs) in the slot/subframe, and may be repeated for a predefined number of subframes. According to a further example embodiment, if the subframe is also used for PDSCH transmission to a legacy UE, the REs used for transmission of the cell-specific DRMS/reference symbols for common system information may be punctured. Further, the eNB may take into account the impact of punctured symbols when scheduling a UE in the corresponding subframes.

According to certain example embodiments, a few symbols of the DL subframes may be used for the additional indication, and the remaining symbols may be used for PDSCH transmission.

As described above, in providing a solution with WUS for every paging occasion and common PDCCH for system information changes, the network may schedule a single common PDCCH for system information/ETWS/CMAS notification within a DRX cycle when WUS is configured for paging reception. In an example embodiment, where the UE, after detecting the WUS prior to the PO, attempts to decode the common PDCCH if its decoding in the PDCCH occasion fails. In addition, after detecting the WUS prior to PO, the UE may monitor for different DMRS in the PO, which indicates presence of common PDCCH for system-info/ETWS/CMAS indication.

Certain example embodiments may provide a solution with new common WUS for system information changes. For example, the eNB may schedule a different WUS sequence than the WUS sequence used for normal paging when system information change/CMAS-ETWS notification is scheduled. For instance, here, the UE may be capable of the new common WUS for system information changes. The UE may also check for this common WUS at a selected location within the DRX cycle. In an example embodiment, the UE may monitor this new common WUS at the common location in addition to monitoring the legacy WUS prior to the PO. If this new common WUS is detected, the UE may attempt to monitor the common PO where the PDCCH for system information change/CMAS-ETWS is scheduled.

In scheduling a new common WUS, one example embodiment may define a common PO for a plurality of UEs. For instance, the eNB may configure a new common WUS sequence transmission location prior to the common paging location for reception of system information change, including ETWS/CMAS changes in system information. Further, the common WUS occasion may be configured at a fixed time and, thus, occur at different time offsets relative to different legacy WUS occasions. For example, according to one embodiment, the common WUS occasion may be defined at one location within a DRX cycle or one or more locations within the hyper frame. The offset location where the PDCCH is scheduled from this WUS may also be configured. In addition, the UE may go to sleep for the period between the legacy WUS occasion and the new common WUS occasion. In another example embodiment, the UE supporting WUS for system information changes may monitor for the presence of a common WUS in every DRX cycle or hyper frame, and attempt to decode the PDCCH on the fixed location to decode further details on the notification.

According to certain example embodiments, it may be possible to provide enhancements to providing a new common WUS for system information changes. For example, in one embodiment, the WUS signal itself may include information for the system information modification and/or common notification such as CMAS/ETWS (e.g., different sequences indicating different system information). After the UE receives WUS from such occasions, the UE may start to acquire system information instead of paging.

In another example embodiment, certain WUS occasions may be reserved to indicate system information modification and/or common notification such as, for example, CMAS/ETWS. After receiving WUS from such WUS occasion, the UE may start to acquire system information instead of paging.

As described above, in providing a new common WUS for system information changes, the network may use separate WUS sequences for normal paging and paging for system information changes, or ETWS/CMAS. This may be performed with the UE monitoring common PDCCH within the DRX cycle on detection of WUS than monitoring the assigned PO. In addition, the network may schedule one common WUS and one common PDCCH for system information/ETWS/CMAS indication for every DRX cycle. Further, in one example embodiment, the common WUS may include the information on whether the common notification is meant for CMAS, ETWS, or system information update. In another example embodiment the UE may detect a separate WUS for normal paging and system-information/ETWS/CMAS indications. On detection of this WUS, the UE may attempt to decode the PDCCH at the common location within the DRX cycle. According to a further example embodiment, the UE may detect the WUS for SI/ETWS/CMAS in a different time location in addition to the PO. For instance, the UE may detect the WUS for SI/ETWS/CMAS in a different time location as compared to the WUS for normal paging. If detected, the UE may attempt to decode the PDCCH at a fixed location within the DRX cycle.

Figure 1A:
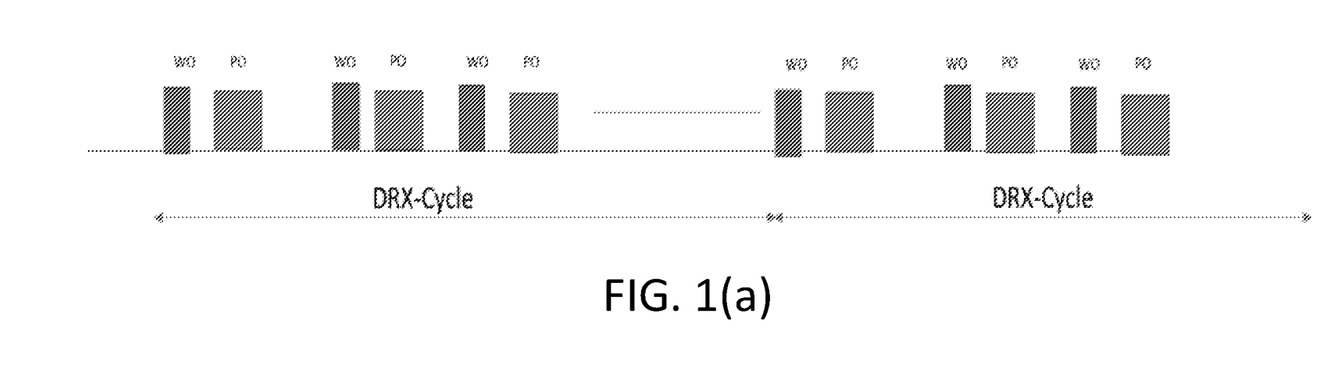
FIG. 1(a), illustrates a solution of system information change notification for a user equipment supporting wake up signal.
Figure 1B:
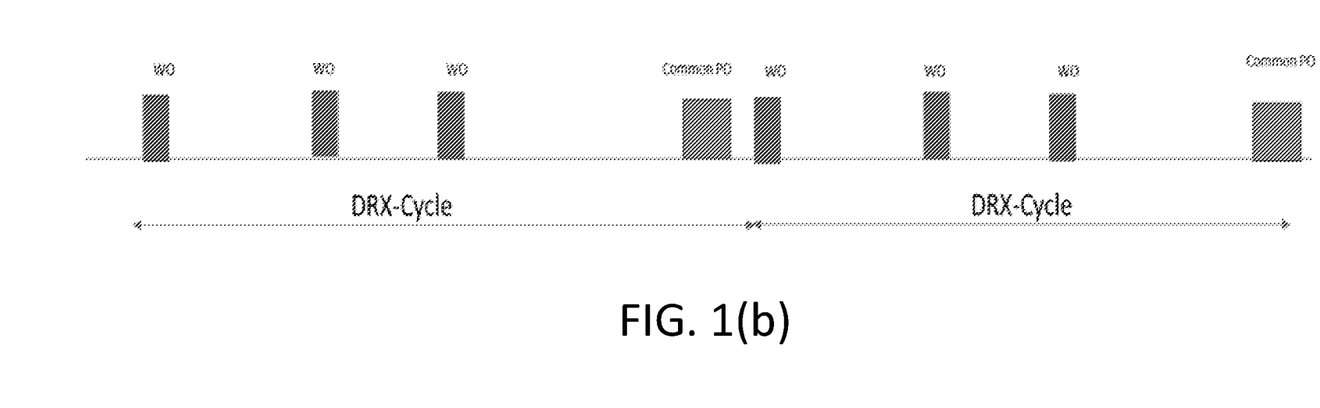
FIG. 1(b) illustrates a solution of system information change notification for the user equipment supporting wake up signal, according to an example embodiment.

FIG. 1(a) illustrates a solution of system information change notification for the UE supporting WUS in Rd-15. In particular, FIG. 1(a) illustrates a solution where for all POs, both WUS and PDCCH needs to be scheduled in every DRX cycle of the system information modification period. Further, FIG. 1(b) illustrates a solution of system information change notification for the UE supporting WUS, according to an example embodiment. Specifically, FIG. 1(b) illustrates a solution where WUS is scheduled in all the POs, and the PDCCH is scheduled at fixed locations within the DRX cycle. FIG. 1(b) also illustrates that the UE may detect WUS first, and then attempt for PDCCH in the PO. In addition, if the UE fails to decode the PDCCH, the UE may find the PDCCH at the common PO location.

FIGS. 1(a) and 1(b) further illustrate a solution where WUS is scheduled before each PO, and the PDCCH is scheduled at a common location, according to an example embodiment. In particular, the PDCCH may be scheduled at a common location to avoid repeating PDCCH in a plurality of POs. The solution illustrated in FIG. 1 may be applicable for new systems including, for example, NR-IoT where the WUS for paging may be introduced in new release. In this case, the same WUS may be used to notify paging and system-information-changes/ETWS-CMAS indications. However, in case of system information changes, the PDCCH may be scheduled in a fixed location instead of in a plurality of POs.

Figure 2:
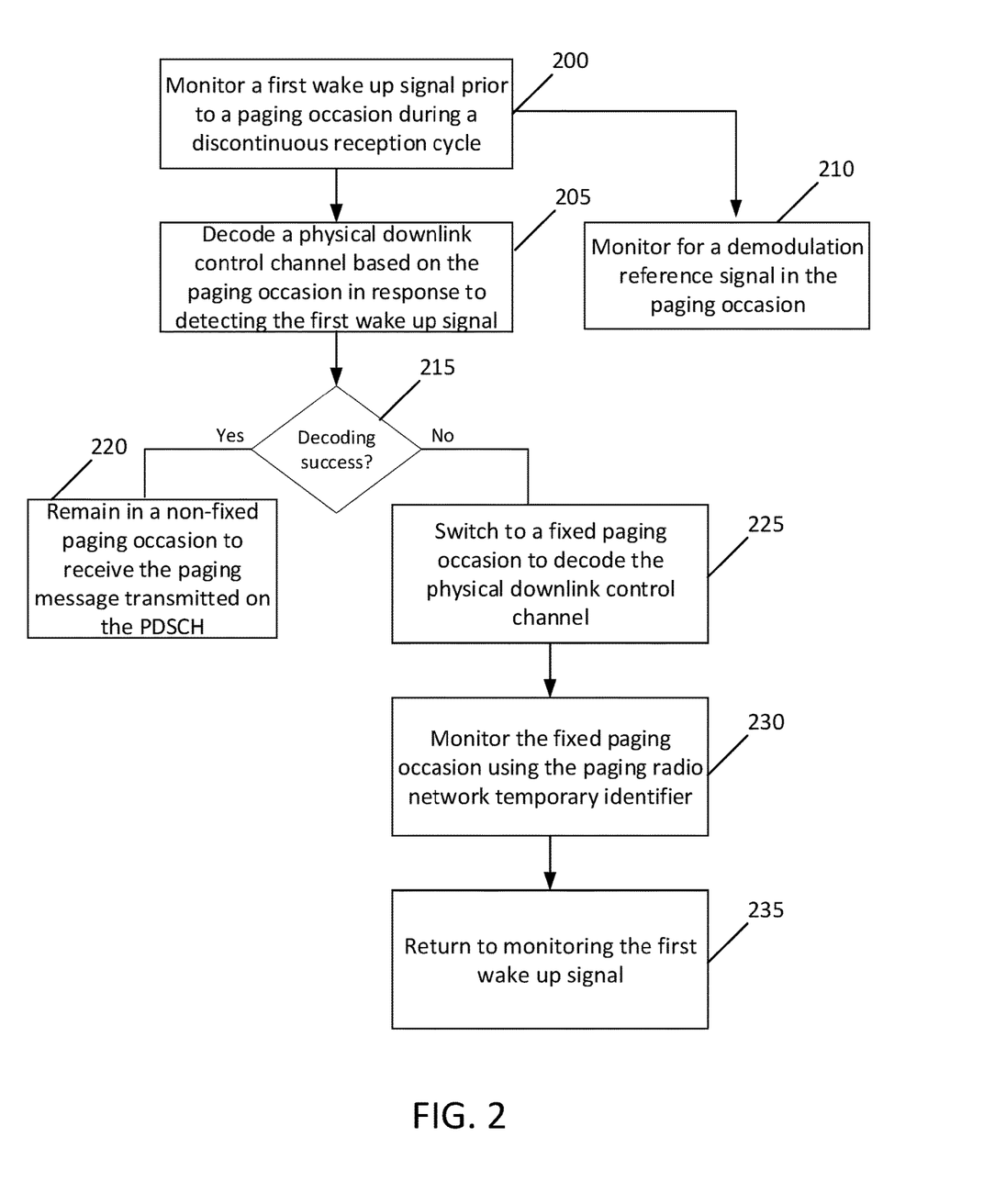
FIG. 2 illustrates a flow diagram of a method, according to an example embodiment.

FIG. 2 illustrates a flow diagram of a method, according to an example embodiment. In certain example embodiments, the flow diagram of FIG. 2 may be performed by a mobile station and/or UE, for instance similar to apparatus 10 illustrated in FIG. 4(a). According to one example embodiment, the method of FIG. 2 may include initially, at 200, monitoring a first WUS prior to a PO during a DRX cycle. The method may also include, at 205, decoding a PDCCH based on the PO in response to detecting the first WUS. The method may further include, at 210, monitoring, after detecting the first WUS, for a DMRS in the PO that indicates presence of a common PDCCH. Further, at 215, the method may include determining if the decoding was successful. If the decoding was successful, the method may include, at 220, remaining in a non-fixed PO to receive the paging message transmitted on the PDSCH. If the decoding was not successful, at 225, the method may include switching to a common PO to decode the PDCCH. The method may also include, at 230, monitoring the common PO using the P-RNTI after failing to decode the PDCCH. Further, at 235, the method may include returning to monitoring the first WUS if the UE fails to decode the PDCCH.

In an example embodiment, the decoding may be performed on the PO using a P-RNTI for downlink control information. In a further example embodiment, the common paging occasion may include a paging occasion common to a plurality of user equipments that may have been configured with different paging occasions for paging monitoring, for example, normal paging monitoring. In another example embodiment, upon determining the decoding fails, for a predefined number of attempts on successively occurring POs, the UE may determine that the first WUS is scheduled for common notification. According to an example embodiment, the common notification may include at least one of system information changes, natural disaster warning system changes, or commercial mobile alert system changes. In an example embodiment, the natural disaster warning system changes may include earthquake and tsunami warning system changes. According to a further example embodiment, the UE may be configured with extended DRX, and the UE may be configured to monitor multiple successive POs within the extended DRX cycle after detecting the first WUS. According to another example embodiment, the method may include monitoring a second WUS for paging for at least one of system information changes, natural disaster warning system changes, or commercial mobile alert system changes during the DRX cycle. According to an example embodiment, the natural disaster warning system changes may include earthquake and tsunami warning system changes. In an example embodiment, the method may also include decoding a PDCCH at the common paging occasion within the DRX cycle when the second WUS is detected. In a further example embodiment, the second WUS may be detected at a different time location compared to the WUS.

Figure 3A:
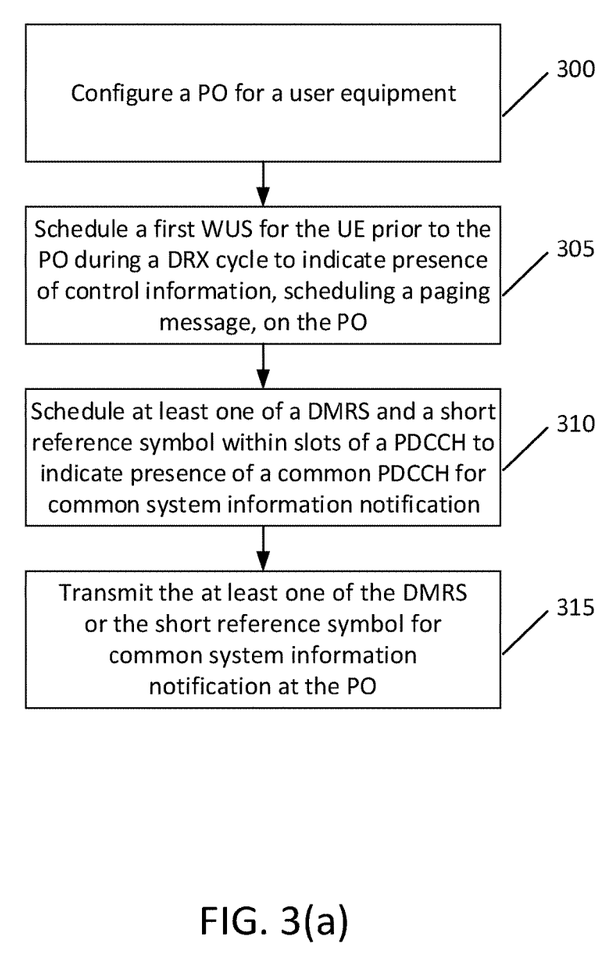
FIG. 3(a) illustrates a flow diagram of another method, according to an example embodiment.
Figure 3B:
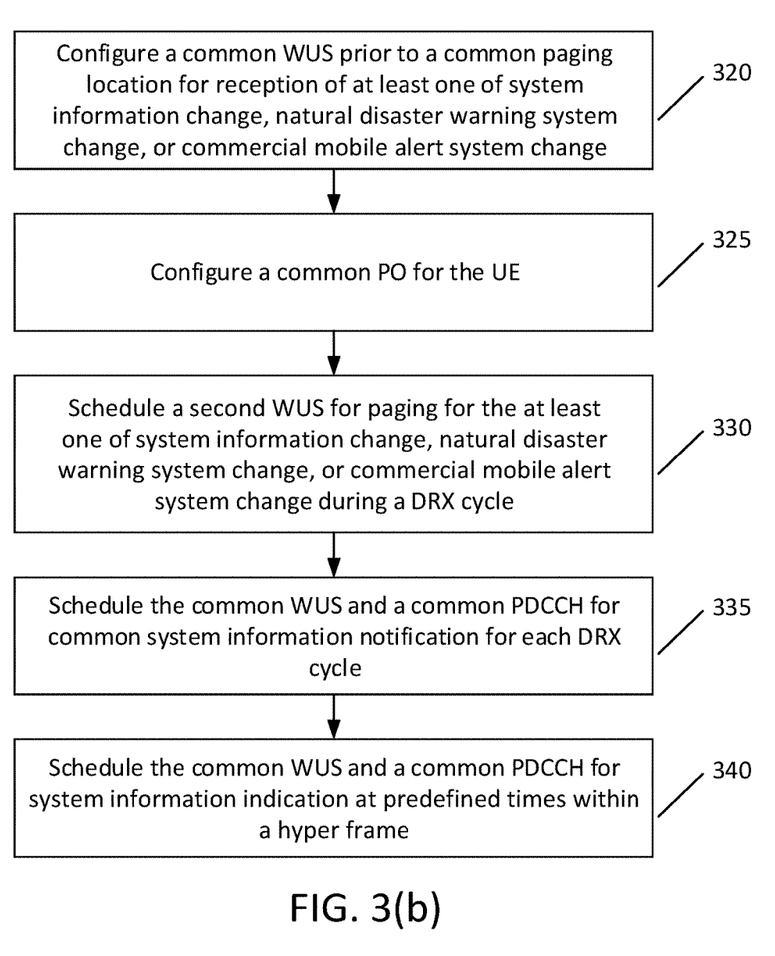
FIG. 3(b) illustrates a flow diagram of a further method, according to an example embodiment.

FIG. 3(a) illustrates a flow diagram of another method, according to an example embodiment. Further, FIG. 3(b) illustrates yet another method, according to an example embodiment. In an example embodiment, the method of FIGS. 3(a) and 3(b) may be performed by a telecommunications network, network entity or network node in a 3GPP system, such as LTE or 5G-NR. For instance, in an example embodiment, the methods of FIGS. 3(a) and 3(b) may be performed by a base station, eNB, or gNB for instance similar to apparatus 20 illustrated in FIG. 4(b).

According to an example embodiment, the method of FIG. 3(a) may include initially, at 300, configuring a PO for a UE. The method may also include, at 305, scheduling a first WUS for the UE prior to the PO during a DRX cycle to indicate presence of control information, scheduling a paging message, on the PO. At 310, the method may include scheduling at least one of a DMRS and a short reference symbol within slots of a PDCCH to indicate presence of a common PDCCH for common system information notification. At 315, transmitting the at least one DMRS or short reference symbol for common system information notification at the PO.

According to an example embodiment, the method of FIG. 3(b) may include, at 320, configuring a common WUS prior to a common paging location for reception of at least one of system information changes, natural disaster warning system changes, or commercial mobile alert system changes. The method may also include, at 325, configuring a common PO for the UE. In addition, the method may include, at 330, scheduling a second WUS for paging for at least one of system information changes, natural disaster warning system changes, and commercial mobile alert system changes during a DRX cycle. Further, at 335, the method may include scheduling the common WUS and a common PDCCH for system information for each DRX cycle. At 340, the method may include scheduling the common WUS and a common PDCCH for system information indication at predefined times within a hyper frame.

In an example embodiment, the natural disaster warning system changes may include earthquake and tsunami warning system changes. In another example embodiment, the DMRS may include a sequence that is mapped to a predefined set of resource elements. According to an example embodiment, the common WUS may be configured at a fixed time. According to another example embodiment, the WUS may include information for system information modification or common notification.

Figure 4A:
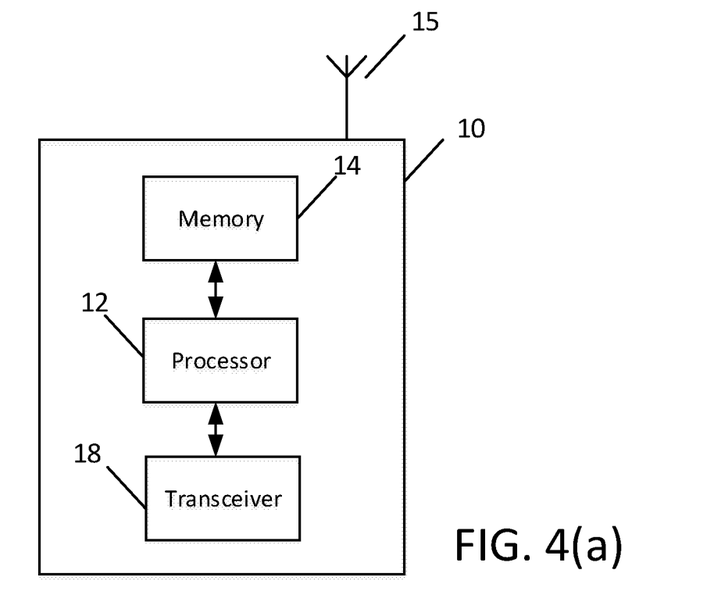
FIG. 4(a) illustrates an apparatus, according to an example embodiment.

FIG. 4(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 4(*a*).

As illustrated in the example of FIG. 4(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4(*a*), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1 and 2.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1 and 2.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to monitor a first WUS prior to a PO during a DRX cycle. Apparatus 10 may also be controlled by memory 14 and processor 12 to decode a PDCCH based on the PO in response to detecting the WUS. If the decoding fails, apparatus 10 may be controlled by memory 14 and processor 12 to switch to a common PO to decode the PDCCH.

Figure 4B:
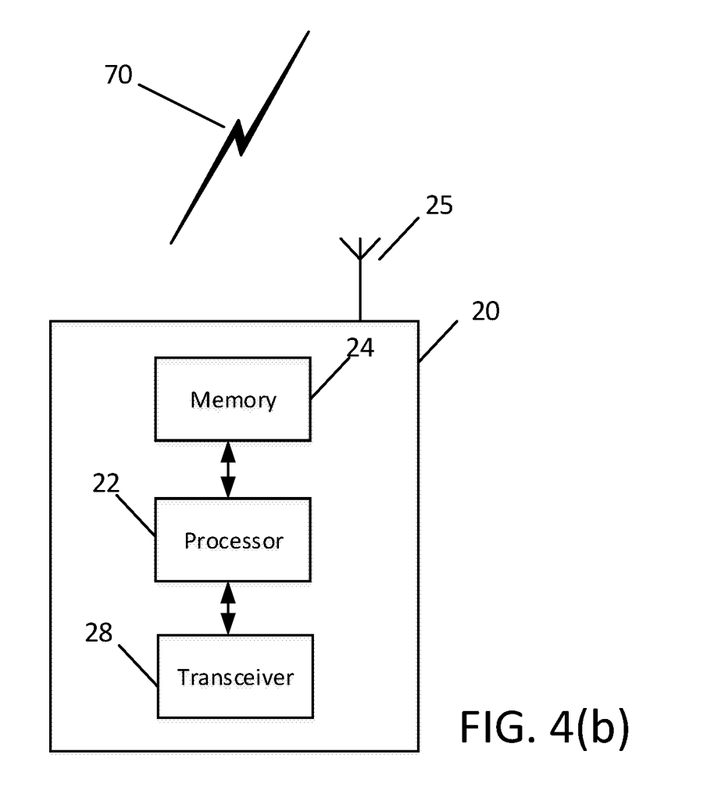
FIG. 4(b) illustrates another apparatus, according to an example embodiment.

FIG. 4(*b*) illustrates an apparatus 20 according to an example embodiment. In an example embodiment, the apparatus 20 may be a RAT, node, host, or server in a communication network or serving such a network. For example, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 4(*b*).

As illustrated in the example of FIG. 4(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4(*b*), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1, 3(*a*), and 3(*b*).

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1, 3(*a*), and 3(*b*).

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to configure a PO for a UE. Apparatus 20 may also be controlled by memory 24 and processor 12 to schedule a first WUS for the UE prior to the PO during a DRX cycle to indicate presence of control information, scheduling a paging message, on the PO.

Certain example embodiments described herein provide several technical improvements, enhancements, and/or advantages. In some example embodiments, it may be possible to provide enhancements for the paging scenarios associated with common paging to all UEs, such as system information modification and CMAS/ETWS indication. According to other example embodiments, it may be possible to optimize the system information change notification with common PDCCH per DRX cycle instead of scheduling the PDCCH in each of the POs. It may also be possible to avoid the need to change the WUS sequence transmission when sending single PDCCH for system information modification instead of sending the WUS and PDCCH multiple times in all the POs. In further example embodiments, it maybe possible to reduce the successive decoding attempts made by the UE for receiving system information changes. In another example embodiment, the benefit of being able to use the subframes for PDSCH transmission outweighs the impact of the loss of the punctured symbols.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

BLER Block Error Rate
CMAS Commercial Mobile Alert System
DCI Downlink Control Information
DRX Discontinuous Reception
DMRS Demodulation Reference Signal
eDRX Extended/Enhanced DRX
eMTC Enhanced Machine-type Communication
eNB Enhanced Node B
ETWS Earthquake and Tsunami Warning System
gNB 5G or NR Base Station
GTSS Go To Sleep Signal
LTE Long Term Evolution
NB-IoT Narrowband Internet of Things
NPDCCH Narrow Band Physical Downlink Control Channel
PDCCH Physical Downlink Control Channel
PO Paging Occasion
P-RNTI Paging Radio Network Temporary Identifier
RAN Radio Access Network
RE Resource Element
SI System Information
UE User Equipment
WUS Wake Up Signal A first embodiment is directed to a method that may include monitoring, by a user equipment, a first wake up signal prior to a paging occasion during a discontinuous reception cycle. The method may also include decoding a physical downlink control channel based on the paging occasion in response to detecting the first wake up signal. The method may further include determining that the decoding failed. After determining that the decoding failed, the method may include switching to a common paging occasion to decode the physical downlink control channel.

In a variant, the decoding is performed on the paging occasion using a paging radio network temporary identifier for downlink control information. The common paging occasion comprises a paging occasion common to a plurality of user equipments. At least two of the plurality of user equipments may have been configured with different paging occasions for paging monitoring.

In a variant, upon determination of the decoding fails for a predefined number of attempts on successively occurring paging occasions, the method may include determining that the first wake up signal is scheduled for common notification. In another variant, the common notification may include at least one of system information changes, natural disaster warning system changes, or commercial mobile alert system changes. The natural disaster warning system changes may include earthquake and tsunami warning system changes.

In a variant, the user equipment may be configured with extended discontinuous reception. In another variant, the user equipment may be configured to monitor multiple successive paging occasions within the extended discontinuous reception cycle after detecting the first wake up signal.

In a variant, after determining that the decoding failed, the method may include monitoring the common paging occasion using the paging radio network temporary identifier.

In a variant, if the user equipment fails to decode the physical downlink control channel, the method may include returning to monitoring the first wake up signal.

In a variant, the method may also include monitoring, after detecting the first wake up signal, for a demodulation reference signal in the paging occasion that indicates presence of a common physical downlink control channel.

In a variant, the method may further include monitoring a second wake up signal for paging for at least one of system information changes, natural disaster warning system changes, or commercial mobile alert system changes during the discontinuous reception cycle. The natural disaster warning system changes may include earthquake and tsunami warning system changes.

In a variant, the method may include decoding a physical downlink control channel at the common paging occasion within the discontinuous reception cycle when the second wake up signal is detected.

In a variant, the second wake up signal may be detected at a different time location compared to the first wake up signal.

A second embodiment may be directed to a method that may include configuring a paging occasion for a user equipment. The method may also include scheduling a first wake up signal for the user equipment prior to the paging occasion during a discontinuous reception cycle to indicate presence of control information, scheduling a paging message, on the paging occasion.

In a variant, the method may also include scheduling at least one of a demodulation reference signal or a short reference symbol within slots of a physical downlink control channel to indicate presence of a common physical downlink control channel for common system information notification.

In a variant, the method may further include transmitting the at least one of the demodulation reference signal or the short reference symbol for common system information notification at the paging occasion.

In a variant, the demodulation reference signal may include a sequence that is mapped to a predefined set of resource elements.

In a variant, the method may also include scheduling a second wake up signal for paging for at least one of system information changes, natural disaster warning system changes, or commercial mobile alert system changes during the discontinuous reception cycle. The natural disaster warning system changes may include earthquake and tsunami warning system changes.

In a variant, the method may further include configuring a common paging occasion for the user equipment, and configuring a common wake up signal prior to a common paging location for reception of at least one of system information changes, natural disaster warning system changes, or commercial mobile alert system changes. The natural disaster warning system changes may include earthquake and tsunami warning system changes.

In a variant, the common wake up signal occasion may be configured at a fixed time. The common paging occasion comprises a paging occasion common to a plurality of user equipments.

At least two of the plurality of user equipments may have been configured with different paging occasions for paging monitoring.

In a variant, the method may further include scheduling the common wake up signal and a common physical downlink control channel for common system information notification for each discontinuous reception cycle.

In a variant, the method may further include scheduling the common wake up signal and a common physical downlink control channel for common system information notification at predefined times within a hyper frame.

In a variant, the common wake up signal may include information for at least one of system information changes, natural disaster warning system changes, commercial mobile alert system changes, or common notification. The natural disaster warning system changes may include earthquake and tsunami warning system changes.

Another embodiment is directed to an apparatus including at least one processor and at least one memory including computer program code. The at least one memory and the computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium including program instructions stored thereon for performing at least the method according to the first embodiment or the second embodiment or any of their variants.

What is claimed is:

1. An apparatus comprising:
   at least one processor, and
   at least one memory including computer program code, the at least one memory and the computer program code configured, with the at least one processor, to cause the apparatus to monitor a first wake up signal prior to a paging occasion during a discontinuous reception cycle;
   decode a physical downlink control channel based on the paging occasion in response to detecting the first wake up signal;
   determine that the decoding failed, and
   switch to a common paging occasion to decode the physical downlink control channel based on the determining that the decoding failed.

2. The apparatus of claim 1, wherein the decoding is performed on the paging occasion using a paging radio network temporary identifier for downlink control information.

3. The apparatus of claim 1, wherein the common paging occasion comprises a paging occasion common to a plurality of user equipments.

4. The apparatus of claim 3, wherein at least two of the plurality of user equipments are configured with different paging occasions for paging monitoring.

5. The apparatus of claim 4, wherein the at least one memory and the computer program code configured, with the at least one processor, to cause the apparatus to: upon determination of the decoding failed for a predefined number of attempts on successively occurring paging occasions, determine that the first wake up signal is scheduled for common notification.

6. The apparatus of claim 5, wherein the common notification comprises at least one of system information changes, natural disaster warning system changes, or commercial mobile alert system changes.

7. The apparatus of claim 6, wherein the natural disaster warning system changes comprises earthquake and tsunami warning system changes.

8. The apparatus of claim 1, wherein the apparatus is configured with extended discontinuous reception.

9. The apparatus of claim 8, wherein the at least one memory and the computer program code configured, with the at least one processor, to cause the apparatus to monitor multiple successive paging occasions within extended discontinuous reception cycle after detecting the first wake up signal.

10. The apparatus of claim 1, wherein the at least one memory and the computer program code configured, with the at least one processor, to cause the apparatus to: after determining that the decoding failed, monitor the common paging occasion using a paging radio network temporary identifier.

11. The apparatus of claim 1, wherein the at least one memory and the computer program code configured, with the at least one processor, to cause the apparatus to return to monitoring the first wake up signal.

12. The apparatus of claim 1, wherein the at least one memory and the computer program code configured, with the at least one processor, to cause the apparatus to: monitor, after detecting the first wake up signal, for a demodulation reference signal in the paging occasion that indicates presence of a common physical downlink control channel.

13. The apparatus of claim 1, wherein the at least one memory and the computer program code configured, with the at least one processor, to cause the apparatus to: monitor a second wake up signal for paging for at least one of system information changes, natural disaster warning system changes, or commercial mobile alert system changes during the discontinuous reception cycle.

14. The apparatus of claim 13, wherein the natural disaster warning system changes comprises earthquake and tsunami warning system changes.

15. The apparatus of claim 13, wherein the at least one memory and the computer program code configured, with the at least one processor, to cause the apparatus to decode a physical downlink control channel at the common paging occasion within the discontinuous reception cycle when the second wake up signal is detected.

16. The apparatus of claim 13, wherein the second wake up signal is detected at a different time location compared to the first wake up signal.

17. A method comprising:
monitoring, by a user equipment, a first wake up signal prior to a paging occasion during a discontinuous reception cycle;
decoding a physical downlink control channel based on the paging occasion in response to detecting the first wake up signal;
determining that the decoding failed, and
switching to a common paging occasion to decode the physical downlink control channel based on the determining that the decoding failed.

* * * * *